(12) United States Patent
Verbridge

(10) Patent No.: US 11,616,418 B2
(45) Date of Patent: Mar. 28, 2023

(54) ELECTRIC VEHICLE DRIVE UNITS

(71) Applicant: Rivian IP Holdings, LLC, Plymouth, MI (US)

(72) Inventor: Mason Verbridge, Canton, MI (US)

(73) Assignee: Rivian IP Holdings, LLC, Plymouth, MI (US)

(*) Notice: Subject to any disclaimer, the term of this patent is extended or adjusted under 35 U.S.C. 154(b) by 726 days.

(21) Appl. No.: 16/220,841

(22) Filed: Dec. 14, 2018

(65) Prior Publication Data

US 2019/0190348 A1 Jun. 20, 2019

Related U.S. Application Data

(60) Provisional application No. 62/612,231, filed on Dec. 29, 2017, provisional application No. 62/599,683, filed on Dec. 15, 2017.

(51) Int. Cl.
| | |
|---|---|
| *H02K 7/116* | (2006.01) |
| *B60K 17/08* | (2006.01) |
| *H02K 11/33* | (2016.01) |
| *B60L 50/51* | (2019.01) |
| *B60K 1/02* | (2006.01) |

(Continued)

(52) U.S. Cl.
CPC ........... *H02K 7/116* (2013.01); *B60K 1/00* (2013.01); *B60K 1/02* (2013.01); *B60K 6/365* (2013.01);

(Continued)

(58) Field of Classification Search
CPC .......... H02K 7/116; H02K 5/04; H02K 7/003; H02K 11/33; B60K 6/365; B60K 1/00;

(Continued)

(56) References Cited

U.S. PATENT DOCUMENTS

| | | |
|---|---|---|
| 3,523,505 A | 8/1970 | Lich |
| 4,046,080 A | 9/1977 | Dieling et al. |

(Continued)

FOREIGN PATENT DOCUMENTS

| | | |
|---|---|---|
| DE | 102017005462 | 11/2017 |
| WO | WO2009009044 | 1/2009 |

(Continued)

OTHER PUBLICATIONS

PCT Provisional Opinion Accompanying the Partial Search Report for Application No. PCT/US2018/065734, dated Feb. 27, 2019 (21 pages).

(Continued)

*Primary Examiner* — Thomas Truong

(74) *Attorney, Agent, or Firm* — Haley Guiliano LLP

(57) ABSTRACT

A dual drive unit may include two motors, two power transfer mechanisms, and two output shafts. The output shafts are co-linear. The dual drive unit may include two single drive units, which may be similar to each other, coupled together at a joint, which may optionally include a clutch. A drive unit may be modular, and various components may be combined to provide power to an output shaft. For example, a drive unit may include a differential at a first interface, which may be removable, and two drive units may be coupled together at the first interface. A drive unit may have a Z configuration, wherein a motor on a first side of a vehicle powers a wheel on an opposite side of the vehicle.

18 Claims, 9 Drawing Sheets

(51) Int. Cl.
*F16H 57/02* (2012.01)
*B60K 1/00* (2006.01)
*B60L 15/20* (2006.01)
*F16H 57/033* (2012.01)
*H02K 7/00* (2006.01)
*B60L 50/00* (2019.01)
*B60K 6/365* (2007.10)
*B60K 23/08* (2006.01)

(52) U.S. Cl.
CPC .......... *B60K 17/08* (2013.01); *B60K 23/0808* (2013.01); *B60L 15/2054* (2013.01); *B60L 50/00* (2019.02); *B60L 50/51* (2019.02); *F16H 57/02* (2013.01); *F16H 57/033* (2013.01); *H02K 7/003* (2013.01); *H02K 11/33* (2016.01); *B60K 2001/001* (2013.01); *B60K 2001/006* (2013.01); *B60L 2210/40* (2013.01); *B60L 2220/42* (2013.01); *B60L 2220/46* (2013.01)

(58) Field of Classification Search
CPC ...... B60K 17/08; B60K 23/0808; B60K 1/02; B60K 2001/001; B60K 2001/006; F16H 57/02; F16H 57/033; B60L 15/2054; B60L 50/51; B60L 50/00; B60L 2210/40; B60L 2220/46; B60L 2220/42; Y02T 10/70; Y02T 10/72; B60Y 2410/10
USPC ...................... 310/83, 89, 112, 113
See application file for complete search history.

(56) References Cited

U.S. PATENT DOCUMENTS

| | | |
|---|---|---|
| 4,353,309 A | 10/1982 | Pollard et al. |
| 5,941,174 A * | 8/1999 | Rodet .................. B61F 3/16 105/96 |
| 5,988,307 A | 11/1999 | Yamada et al. |
| 7,028,583 B2 | 4/2006 | Bennett |
| 7,255,187 B2 | 8/2007 | Bell et al. |
| 8,758,179 B2 | 6/2014 | Diemer et al. |
| 10,807,466 B1 | 10/2020 | Haka et al. |
| 10,938,273 B2 | 3/2021 | Verbridge et al. |
| 2005/0109549 A1 * | 5/2005 | Morrow .................. B60K 6/46 180/65.245 |
| 2011/0177903 A1 | 7/2011 | Campbell |
| 2012/0165147 A1 | 6/2012 | Radermacher et al. |
| 2014/0045648 A1 | 2/2014 | Bangura et al. |
| 2014/0288753 A1 | 9/2014 | Engdahl |
| 2015/0014073 A1 | 1/2015 | Murakanni et al. |
| 2015/0211616 A1 | 7/2015 | Yang et al. |
| 2016/0083930 A1 | 3/2016 | Monden et al. |
| 2016/0146337 A1 | 5/2016 | Naito et al. |
| 2016/0229289 A1 * | 8/2016 | Frohnmayer ........ B60K 17/043 |
| 2017/0182884 A1 | 6/2017 | Jeong |
| 2019/0054819 A1 * | 2/2019 | Tamura ................ B60K 7/0007 |
| 2019/0186616 A1 * | 6/2019 | Bassis .................. B60L 15/2054 |
| 2019/0186617 A1 | 6/2019 | Verbridge et al. |
| 2019/0331200 A1 * | 10/2019 | Barendrecht ............ B60K 1/02 |

FOREIGN PATENT DOCUMENTS

| | | | |
|---|---|---|---|
| WO | WO2017207977 | 12/2017 | |
| WO | WO-2017211793 A1 * | 12/2017 | ........... B60K 7/0007 |

OTHER PUBLICATIONS

U.S. Appl. No. 16/220,795, filed Dec. 14, 2018, Mason Verbridge.
U.S. Appl. No. 16/220,741, filed Dec. 14, 2018, Mason Verbridge.
International Search Report and Written Opinion, dated Apr. 17, 2019, issued in Int'l. App. No. PCT/US2018/065734 (22 pages).

* cited by examiner

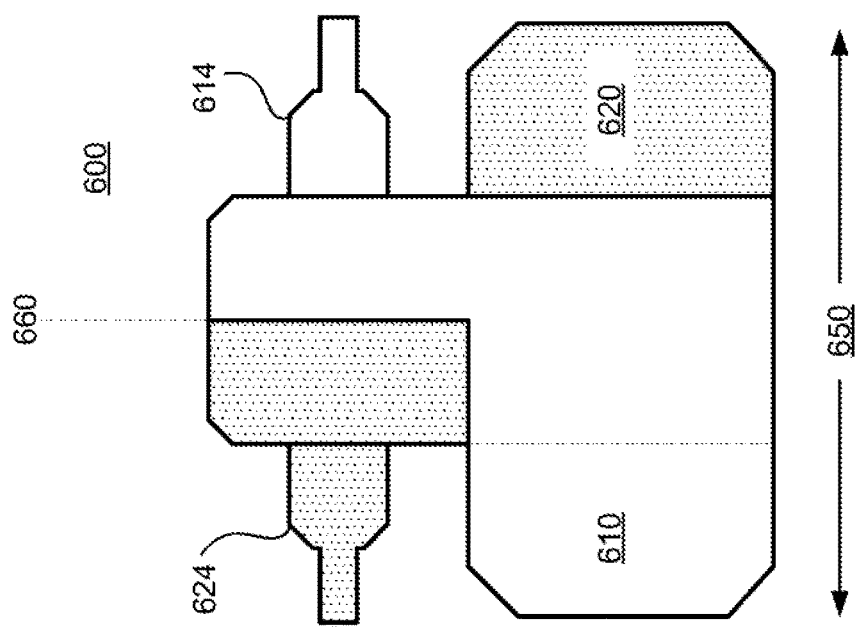
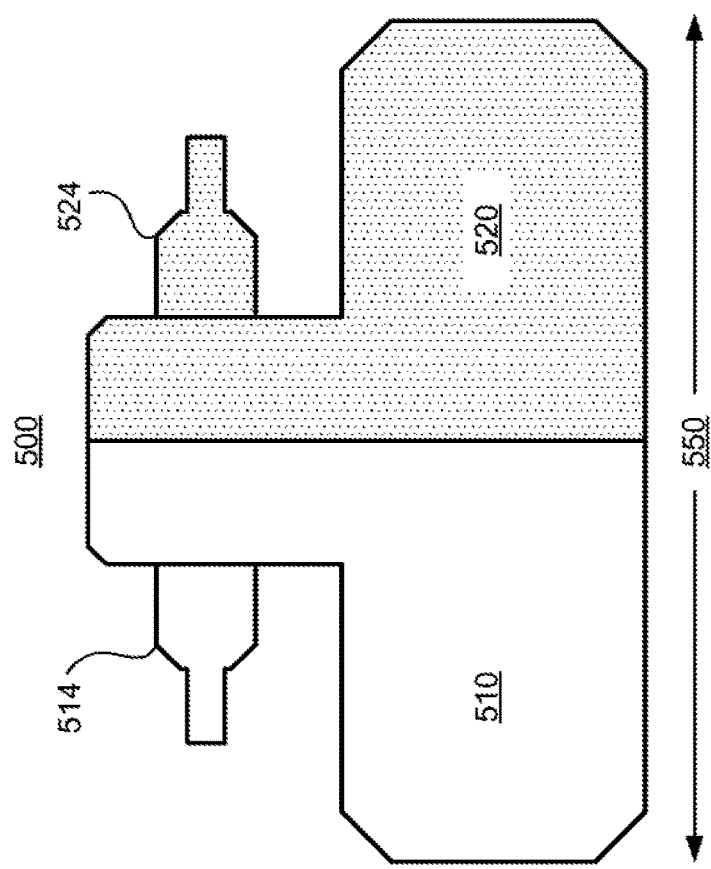

ELECTRIC VEHICLE DRIVE UNITS

CROSS-REFERENCE TO RELATED APPLICATIONS

This application claims the benefit of U.S. Provisional Patent Application No. 62/599,683 filed Dec. 15, 2017 and U.S. Provisional Patent Application No. 62/612,231 filed Dec. 29, 2017, the disclosures of which are hereby incorporated by reference herein in their entireties.

INTRODUCTION

Conventional drive units that use two electric motors and two axle outputs typically align the two motors on the same rotational axis. The rotor shafts of the two motors may, for example, each enter a respective gearbox that is positioned between the two motors. This results in a stack-up of components that makes the drive unit wide, and therefore difficult to package in certain applications. This can limit, for example, the length of the motors that can be used, which in turn limits the amount of torque and power that the motors can provide. Accordingly, it would be advantageous to provide a drive unit configuration that is shaped more conveniently for packaging. It would also be advantageous to provide a drive unit that enables a wider range of motors and accompanying components to be used.

Conventional drive units and associated gearboxes are typically designed for specific applications. For example, gearboxes are typically designed to be used in a single motor drive unit or a dual motor drive unit, but not both. As another example, a gearbox is typically designed to be used in a particular orientation and for driving a set number of wheels. Accordingly, it would be advantageous to provide modular drive unit components that can be used for more than one application. It would also be advantageous to provide modular drive unit components that can be used in more than one orientation. It would also be advantageous to provide modular drive units which may be independent or coupled to adapt to changing driving conditions.

SUMMARY

In some embodiments, the present disclosure is directed to a drive system. The drive system includes a first output shaft configured to rotate about a drive axis and a second output shaft configured to rotate about the drive axis. The first output shaft and the second output shaft are orientated away from each other. For example, the output shafts are arranged co-linearly on the axis. The drive system includes a first motor having a first motor shaft that rotates about a first motor axis. The first motor axis is parallel to the drive axis. The drive system includes a second motor having a second motor shaft that rotates about a second motor axis. The first motor axis is parallel to and spaced apart from the second motor axis. The drive system includes a first power transfer mechanism configured to couple rotation of the first motor shaft to rotation of the first output shaft. The drive system includes a second power transfer mechanism configured to couple rotation of the second motor shaft to rotation of the second output shaft.

In some embodiments, the first power transfer mechanism and the second power transfer mechanism each include a gear train.

In some embodiments, the gear train of the first power transfer mechanism and the second power transfer mechanism each include a first gear, at least one second gear, and a third gear. The first gear is coupled to a corresponding motor shaft. The at least one second gear is coupled to an intermediate shaft. The third gear is coupled to a corresponding output shaft. The first gear mechanically interfaces with the at least one second gear and the at least one second gear mechanically interfaces with the third gear.

In some embodiments, the at least one second gear includes two gears coupled to the intermediate shaft. The two gears include a first larger gear and a second smaller gear. The first larger gear mechanically interfaces with the first gear, and the second smaller gear mechanically interfaces with third gear. The first power transfer mechanism and the second power transfer mechanism each provide a gear reduction between a motor shaft and corresponding output shaft.

In some embodiments, the intermediate shaft is offset from a line considered to extend from the motor shaft to the output shaft.

In some embodiments, the first power transfer mechanism includes a first housing extending between the first motor shaft and the first output shaft. The first housing includes an indentation to accommodate the second motor. The second power transfer mechanism includes a second housing extending between the second motor shaft and the second output shaft. The second housing includes an indentation to accommodate the first motor.

In some embodiments, when the drive system is viewed perpendicular to the drive axis, the first power transfer mechanism at least partially overlaps with the second motor and the second power transfer mechanism at least partially overlaps with the first motor.

In some embodiments, the first power transfer mechanism includes a first end proximate to the first motor axis and a second end proximate to the first output shaft. The second end of the first power transfer mechanism is located a first distance away from the first motor axis, which is greater than a distance from the first motor axis to an outer side surface of the first motor. The second power transfer mechanism includes a first end proximate to the second motor axis and a second end proximate to the second output shaft. The second end of the second power transfer mechanism is located a second distance away from the second motor axis, which is greater than a distance from the second motor axis to an outer side surface of the second motor. The second end of the first power transfer mechanism is adjacent to the second end of the second power transfer mechanism.

In some embodiments, the second end of the first power transfer mechanism is mechanically connected to the second end of the second power transfer mechanism.

In some embodiments, the first power transfer mechanism and the second power transfer mechanism each include a chain drive or a belt drive.

In some embodiments, the first motor shaft and the second motor shaft at least partially overlap when viewed in a direction perpendicular to the first motor axis.

In some embodiments, the first motor includes a first motor housing and the second motor includes a second motor housing. The first motor housing and the second motor housing partially overlaps when viewed in a direction perpendicular to the first motor axis.

In some embodiments, the first motor shaft extends from the first motor in a first direction and wherein the first output shaft extends from the first power transfer mechanism in the first direction.

In some embodiments, the second motor shaft extends from the second motor in a second direction, wherein the second output shaft extends from the second power transfer mechanism in the second direction, and wherein the first direction and second direction are opposite directions.

In some embodiments, when the drive system is viewed parallel to the drive axis, first motor axis, and second motor axis and when a first line is considered to extend from the drive axis to the first motor axis and when a second line is considered to extend from the drive axis to the second motor axis, an angle between the first line and the second line is less than 90 degrees.

In some embodiments, the drive system includes a first invertor configured to control the operation one of the first motor and the second motor, wherein the first inverter is aligned with first motor axis and mechanically coupled to the first power transfer mechanism. In some embodiments, the drive system includes a second invertor configured to control the operation the other of the first motor and the second motor, wherein the second inverter is aligned with second motor axis and mechanically coupled to the second power transfer mechanism.

In some embodiments, the drive system includes a clutch assembly coupled to the first output shaft and the second output shaft, wherein the clutch assembly, when engaged, is configured to lock the first output shaft and the second output shaft together.

In some embodiments, the drive system includes a first half shaft, wherein a first end of the first half shaft is coupled to the first output shaft. The drive system includes a first wheel, wherein a second end of the first half shaft is coupled to the first wheel. In some embodiments, the drive system includes a second half shaft, wherein a first end of the second half shaft is coupled to the second output shaft, and a second wheel, wherein a second end of the second half shaft is coupled to the second wheel.

In some embodiments, the present disclosure is directed to a drive system having a clutch assembly. The drive system includes a first motor having a first motor shaft configured to rotate. The drive system includes a first output shaft configured to rotate about a drive axis. The drive system includes a first power transfer mechanism configured to couple rotation of the first motor shaft to rotation of the first output shaft and reduce a rotation rate of the first output shaft relative to a rotation rate of the first motor shaft. The drive system includes a second motor having a second motor shaft configured to rotate. The drive system includes a second output shaft configured to rotate about the drive axis. The drive system includes a second power transfer mechanism configured to couple rotation of the second motor shaft to rotation of the second output shaft and reduce a rotation rate of the second output shaft relative to a rotation rate of the second motor shaft. The clutch assembly is coupled to the first output shaft and the second output shaft, wherein the clutch assembly, when engaged, is configured to transfer torque between the first output shaft and the second output shaft.

In some embodiments, the clutch assembly includes one of a slip clutch and a non-slip clutch.

In some embodiments, the first motor shaft is configured to rotate about a first motor axis, the second motor shaft is configured to rotate about a second motor axis, and the first motor axis and the second motor axis are parallel to each other and offset with respect to each other.

In some embodiments, the first power transfer mechanism and the second power transfer mechanism each include a gear train.

In some embodiments, the gear train of the first power transfer mechanism and the second power transfer mechanism each include a first gear, at least one second gear, and a third gear. The first gear is coupled to a corresponding motor shaft. The at least one second gear is coupled to an intermediate shaft. The third gear is coupled to a corresponding output shaft, wherein the first gear mechanically interfaces with the at least one second gear and wherein the at least one second gear mechanically interfaces with the third gear.

In some embodiments, the at least one second gear includes a first larger gear and a second smaller gear coupled to the intermediate shaft. The first larger gear mechanically interfaces with the first gear and the second smaller gear mechanically interfaces with the third gear. The first power transfer mechanism and the second power transfer mechanism each provide a gear reduction between the corresponding motor shaft and the corresponding output shaft.

In some embodiments, each intermediate shaft is offset from a line considered to extend from the corresponding motor shaft to the corresponding output shaft.

In some embodiments, the first power transfer mechanism includes a first housing extending between the first motor shaft and the first output shaft. The first housing includes an indentation to accommodate the second motor. The second power transfer mechanism includes a second housing extending between the second motor shaft and the second output shaft. The second housing includes an indentation to accommodate the first motor.

In some embodiments, when the drive system is viewed perpendicular to the drive axis, the first power transfer mechanism at least partially overlaps with the second motor and the second power transfer mechanism at least partially overlaps with the first motor.

In some embodiments, the first power transfer mechanism includes a first end proximate to the first motor shaft and a second end proximate to the first output shaft. The second end of the first power transfer mechanism is located a first distance away from the first motor shaft, which is greater than a distance from the first motor shaft to an outer side surface of the first motor. The second power transfer mechanism includes a first end proximate to the second motor shaft and a second end proximate to the second output shaft. The second end of the second power transfer mechanism is located a second distance away from the second motor shaft, which is greater than a distance from the second motor shaft to an outer side surface of the second motor. The second end of the first power transfer mechanism is adjacent to the second end of the second power transfer mechanism.

In some embodiments, the first power transfer mechanism and the second power transfer mechanism each include a chain drive or a belt drive.

In some embodiments, the first motor shaft extends from the first motor in a first direction and the first output shaft extends from the first power transfer mechanism in the first direction.

In some embodiments, the second motor shaft extends from the second motor in a second direction, the second output shaft extends from the second power transfer mechanism in the second direction, and the first direction and second direction are opposite directions.

In some embodiments, when the drive system is viewed parallel to the drive axis, first motor shaft, and second motor shaft and when a first line is considered to extend from the drive axis to the first motor shaft and when a second line is considered to extend from the drive axis to the second motor shaft, an angle between the first line and the second line is less than 90 degrees.

In some embodiments, a drive system includes a first inverter configured to control the operation of one of the first motor and the second motor, wherein the first inverter is aligned with the first motor shaft and mechanically coupled to the first power transfer mechanism. In some embodiments, a drive system includes a second inverter configured to control the operation of the other of the first motor and the second motor, wherein the second inverter is aligned with the second motor shaft and mechanically coupled to the second power transfer mechanism.

In some embodiments, the first power transfer mechanism includes a first housing, the second power transfer mechanism includes a second housing, and the clutch assembly includes a clutch housing. The clutch housing is configured to rigidly couple to both the first housing and the second housing.

In some embodiments, a drive system includes a first half shaft, wherein a first end of the first half shaft is coupled to the first output shaft. The drive system includes a first wheel, wherein a second end of the first half shaft is coupled to the first wheel. The drive system includes a second half shaft, wherein a first end of the second half shaft is coupled to the second output shaft. The drive system includes a second wheel, wherein a second end of the second half shaft is coupled to the second wheel.

In some embodiments, a drive system includes processing equipment configured to activate and deactivate the clutch assembly.

In some embodiments, a drive system includes at least one sensor configured to sense wheel slippage. The processing equipment is further configured to receive a signal from the at least one sensor, detect that wheel slippage is occurring based on the signal, and activate the clutch assembly in response to detecting that wheel slippage is occurring.

In some embodiments, a drive system includes an accelerator pedal configured to indicate a desired speed. The processing equipment is further configured to receive a signal from the accelerator pedal, determine a speed parameter based on the signal, and activate the clutch assembly if the speed parameter is above a threshold.

In some embodiments, the processing equipment is configured to identify a drive mode, and activate and deactivate the clutch assembly based on the identified drive mode.

In some embodiments, the processing equipment is configured to determine at least one road condition, and activate or deactivate the clutch assembly based at least in part on the at least one road condition.

In some embodiments, the present disclosure is directed to a method for managing a drive system. The method includes determining at least one parameter, determining whether to change a clutch setting based on the at least one parameter, and activating or deactivating the clutch assembly when it is determined to change the setting.

In some embodiments, the present disclosure is directed to a modular drive system. The modular drive system includes a gearbox housing. The gearbox housing includes a motor mount configured for mounting of an electric motor. The gearbox housing includes a first space within the gearbox housing capable of receiving an input gear capable of being coupled to the electric motor. The gearbox housing includes a second space within the gearbox housing capable of receiving an output gear. The gearbox housing includes at least one intermediate gear mounted within the first gearbox housing. The at least one intermediate gear is configured to mechanically interface with the input gear and mechanically interface with the output gear. The gearbox housing includes a first opening in a first side of the gearbox housing adjacent to the second space. The gearbox housing includes a second opening in a second side of the gearbox housing adjacent to the second space. The first side and the second side are opposite sides of the gearbox housing. The second opening is configured to enable an output shaft to pass through to drive a first wheel. The first opening includes a mount configured for mounting of a differential housing and a cover plate. When the differential housing is mounted to the mount, the modular drive system is capable of driving two wheels. When the cover plate is mounted to the mount, the modular drive system is capable of driving the first wheel.

In some embodiments, the at least one intermediate gear includes a compound gear having a larger gear and a smaller gear. The larger gear is configured to mechanically interface with the input gear and the smaller gear is configured to mechanically interface with the output gear.

In some embodiments, the gearbox housing is a first gearbox housing and the output shaft is a first output shaft having a first rotational axis. At least one of the cover plate and the gearbox housing is configured for attachment to a second gearbox housing. The second gearbox housing includes a second output shaft having a second rotational axis. When the second gearbox housing is attached to the first gearbox housing, the first rotational axis and the second rotational axis are aligned.

In some embodiments, the electric motor is a first electric motor and the second gearbox housing further includes a motor mount configured for mounting of a second electric motor.

In some embodiments, the first gearbox housing and the second gearbox housing each provide a gear reduction between a corresponding motor shaft and corresponding output shaft.

In some embodiments, the gearbox housing further includes an intermediate shaft. The at least one intermediate gear is mounted to the intermediate shaft and the intermediate shaft is offset from a line considered to extend from a center of the input gear to a center of the output shaft.

In some embodiments, the first gearbox housing includes an indentation to accommodate the second motor and the second gearbox housing includes an indentation to accommodate the first motor.

In some embodiments, the first output shaft rotates about a first drive axis. When the modular drive system is viewed perpendicular to the drive axis, the first gearbox housing at least partially overlaps with the second motor and the second gearbox housing at least partially overlaps with the first motor.

In some embodiments, the first gearbox housing includes a first end proximate to a first motor shaft of the first motor and a second end proximate to the first output shaft. The second end of the first gearbox housing is located a first distance away from the first motor shaft, which is greater than a distance from the first motor shaft to an outer side surface of the first motor. The second gearbox housing includes a first end proximate to a second motor shaft of the second motor and a second end proximate to the second output shaft. The second end of the second gearbox housing is located a second distance away from the second motor shaft, which is greater than a distance from the second motor shaft to an outer side surface of the second motor. The second end of the first gearbox housing is adjacent to the second end of the second gearbox housing.

In some embodiments, the second end of the first gearbox housing is mechanically connected to the second end of the second gearbox housing.

In some embodiments, a motor shaft of the electric motor extends from the electric motor in a first direction and wherein the output shaft extends from the gearbox housing in the first direction.

In some embodiments, the modular drive system includes an inverter configured to control the operation of the electric motor, wherein the inverter is aligned with the motor shaft and mechanically coupled to the gearbox housing.

In some embodiments, the gearbox housing is a first gearbox housing. The mount is further configured for mounting of a clutch assembly coupled to a second gearbox housing. The output shaft is a first output shaft having a first rotational axis. The second gearbox housing includes a second output shaft having a second rotational axis. When the clutch assembly coupled to the second gearbox housing is mounted to the mount, the first rotational axis and the second rotational axis are aligned.

In some embodiments, the present disclosure is directed to a method of configuring the modular drive system. The method includes determining a desired drive configuration, mounting the differential housing to the mount when the desired configuration is a single drive configuration, and mounting the cover plate to the mount when the desired configuration is a dual drive configuration.

In some embodiments, the present disclosure is directed to a gearbox capable of being used in two different orientations. The gearbox includes a gearbox housing. The gearbox housing includes a motor mount configured for mounting of an electric motor. The gearbox housing includes a first space within the gearbox housing capable of receiving an input helical gear capable of being coupled to the electric motor. The gearbox housing includes a second space within the gearbox housing capable of receiving an output helical gear capable of being coupled to an output shaft. The gearbox housing includes at least one intermediate helical gear mounted within the gearbox housing. The at least one intermediate helical gear is configured to mechanically interface with the input gear and mechanically interface with the output gear. Each of the at least one intermediate helical gear is capable of being mounted in a first gear orientation and a second gear orientation. The second gear orientation is rotated 180 degrees, from the first gear orientation, about an axis perpendicular to an axis of rotation of the respective intermediate helical gear. Each of the at least one intermediate helical gear is mounted in the first gear orientation when the gearbox housing is intended to be used in a first gearbox orientation. Each of the least one intermediate helical gear is mounted in the second gear orientation when the gearbox housing is intended to be used in a second gearbox orientation. The second gearbox orientation is rotated 180 degrees, from the first gearbox orientation, about an axis perpendicular to the drive axis.

In some embodiments, the at least one intermediate helical gear includes a compound gear having a larger helical gear and a smaller helical gear. The larger gear is configured to mechanically interface with the input gear and the smaller gear is configured to mechanically interface with the output gear.

In some embodiments, the at least one intermediate helical gear provides a gear reduction between a motor shaft of the electric motor and the output gear.

In some embodiments, the at least one intermediate helical gear is mounted to an intermediate shaft, and wherein the intermediate shaft is offset from a line considered to extend from the motor shaft to the output shaft.

In some embodiments, the present disclosure is directed to a method for configuring a gearbox. The method includes determining an intended gearbox orientation of the gearbox housing and mounting each of the at least one helical gear in the first gear orientation or the second gear orientation based on the intended gearbox orientation.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

FIG. 5 shows an end view of an illustrative "C" type dual drive unit, in accordance with some embodiments of the present disclosure;

FIG. 6 shows an end view of an illustrative "Z" type dual drive unit, in accordance with some embodiments of the present disclosure;

DETAILED DESCRIPTION

The present disclosure is directed to improvements in motor drive unit architectures. In some embodiments, the motor drive unit architecture aligns two motors on different axes. In some embodiments, this architecture enables longer motors (e.g., for providing more torque and power) to be packaged and/or decreases the width of the drive unit. In some embodiments, the present disclosure is directed to drive units having modularity, allowing a plurality of configurations to be realized. In some embodiments, this architecture also enables several different arrangements for packaging power electronics. Accordingly, in some embodiments, the dual motor drive unit is able to accommodate a wide variety of available motors and inverters.

In some circumstances, dual drive units provide various advantages, including the ability to provide torque vectoring. The dual drive units of the present disclosure may provide one or more advantages over conventional dual drive units. In some embodiments, the dual drive units of the present disclosure may be configured to fit into vehicles that are otherwise too small to fit the necessary hardware. This enables torque vectoring drive units to be appropriately packaged in smaller passenger vehicles. In some embodiments, the dual drive units of the present disclosure enable the use of relatively larger motors to fit in high performance applications that already employ torque vectoring drive units. This results in even more power in high output torque vectoring cars. In some embodiments, the dual drive units of the present disclosure enable the use of longer half shafts, which means more suspension travel is possible without compromising vehicle speed. Therefore, off-road applications or modes that require more suspension travel overall can be used at much higher speeds than with conventional dual motor drive units.

Figure 1:
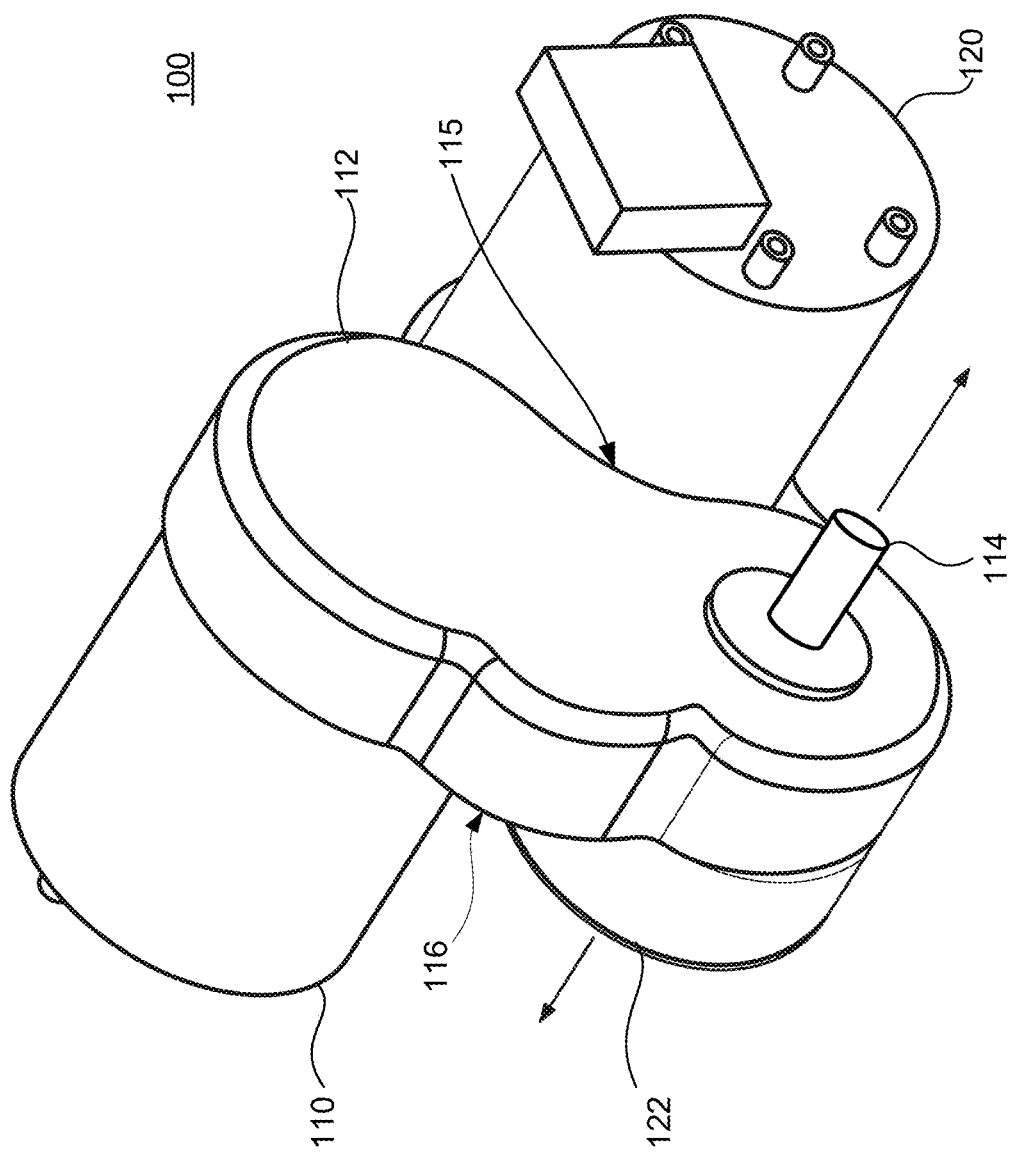
FIG. 1 shows a perspective view of an illustrative dual drive unit, in accordance with some embodiments of the present disclosure.
Figure 3:
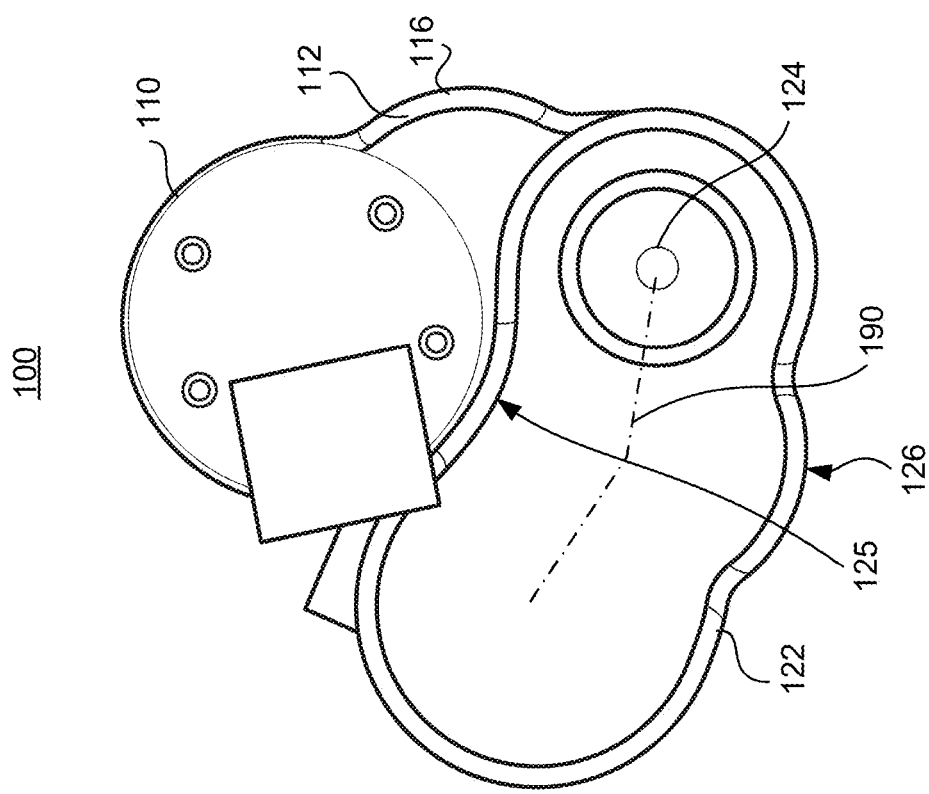
FIG. 3 shows a side view of the illustrative dual drive unit of FIG. 1, in accordance with some embodiments of the present disclosure.
Figure 2:
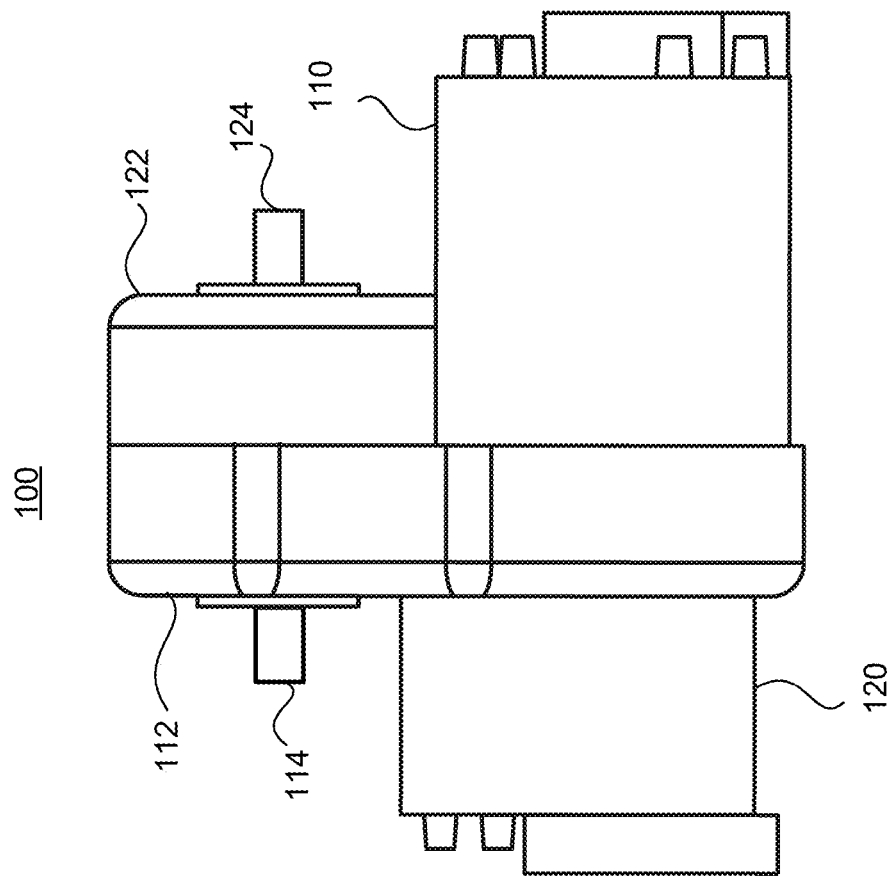
FIG. 2 shows an end view of the illustrative dual drive unit of FIG. 1, in accordance with some embodiments of the present disclosure.

FIG. 1 shows a perspective view of illustrative dual drive unit 100, in accordance with some embodiments of the present disclosure. FIG. 2 shows an end view of illustrative dual drive unit 100 of FIG. 1, in accordance with some embodiments of the present disclosure. FIG. 3 shows a side view of illustrative dual drive unit 100 of FIG. 1, in accordance with some embodiments of the present disclosure. Dual drive unit 100 may be considered to have opposite halves: motor 110 and gearbox 112 form one half, and motor 120 and gearbox 122 form a second half. As illustrated, each half includes a motor (e.g., motor 110 or 120), a gearbox (e.g., gearbox 112 or 122), and an output (e.g., output shaft 114 or 124). In some embodiments, motors 110 and 120 each include a motor shaft that is configured to rotate about a respective motor axis (e.g., using roller bearings).

As illustrated in FIGS. 1-3, the motor axes are parallel to each other, but spaced apart (e.g., parallel but not co-linear). This configuration enables the drive shafts, which extend from the motors to overlap each other (axially, shown in FIG. 2) when viewing the motors perpendicular to the motor axes. Further, this configuration enables the gearbox for each motor to be positioned on the opposite side of the other gearbox and power the wheel on the opposite side of the car as the corresponding motor. For example, referencing FIG. 2, motor 110 on the right is configured to provide power to the left wheel. As illustrated in FIG. 2, the gearbox for each motor extends past the gearbox for the opposing motor and then aligns at the far end by the output shaft (e.g., the output shafts have axes that are co-linear). In some embodiments, the ends of gearboxes 112 and 122 that are proximate to output shafts 114 and 124 are mechanically coupled together. For example, gearboxes 112 and 122 may be bolted together along the outside seam where they meet (e.g., which may include a flange having locating pins). As illustrated in FIG. 3, gearbox 122 includes an indentation 125, with corresponding protrusion 126, to accommodate motor 110. This enables tight, efficient packing of motors 110 and 120, and corresponding gearboxes 112 and 122. In some embodiments, to accommodate the indentation (e.g., indentation 115 or 125) and/or protrusion (e.g., protrusion 116 or 126) in the gear box, the gearset may include an intermediate gear that is configured to rotate about an axis that is offset from a line connecting the motor shaft and the output shaft. For example, to accommodate the offset, the opposite side of the gearbox may then need a protrusion, as illustrated by protrusions 116 and 126. In some embodiments, a gearbox may be shaped, or otherwise have features included, based on constraints such as, for example, oil circulation, avoidance of interfering components, achieving a desired rigidity, ease of mounting, ease of installation, any other suitable constraint, or any combination thereof. For example, as illustrated in FIG. 3, gearbox 122 includes an intermediate gear offset from the output shaft and motor shaft (e.g., giving gearbox 122 a slight v-shaped profile 190). In some embodiments, the angle of the profile 190 may include any suitable angle (e.g., less than 90 degrees, or greater than 90 degrees).

In some embodiments, motor 110, motor 120, or both, may include cooling passages configured to direct coolant flow. Because the single drive units are coupled together, the cooling passages of the two halves may interface. For example, each motor may include serpentine channels having an inlet and outlet port, and each of gearboxes 112 and 122 may interface to the inlet and outlet, and also include passages connecting the inlets and outlets of the two motors together (e.g., in series or parallel). In some embodiments, gearboxes 112 and 122 include cooling passages configured for cooling of oil, cooling of bearings, cooling of the housing structure, cooling of any other suitable component, or any combination thereof.

Figure 4:
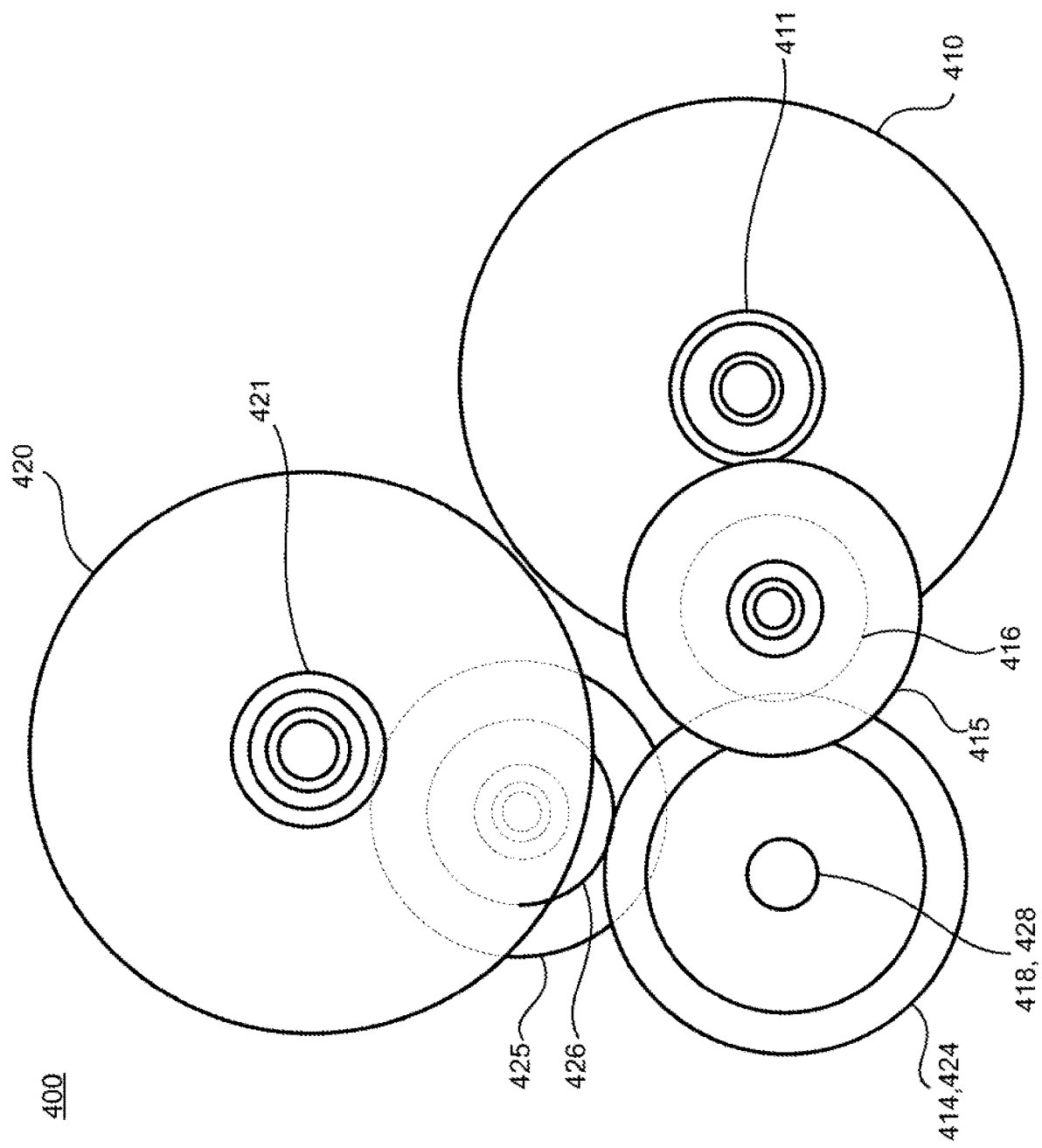
FIG. 4 shows an illustrative arrangement of gears within the gearboxes of FIGS. 1-3, in accordance with some embodiments of the present disclosure.

FIG. 4 shows an illustrative arrangement 400 of gears within gearboxes, in accordance with some embodiments of the present disclosure. Gearbox housings are not illustrated in FIG. 4 for clarity. As illustrated, each gearset (e.g., gears 411, 415, 416, and 414 are one gearset, and gears 421, 425, 426, and 424 are another gearset) includes a double reduction gear. Each motor (e.g., motor 410 and motor 420), includes a motor shaft having a first gear. For example, first gear 411 is affixed to the shaft of motor 410, and first gear 421 is affixed to the shaft of motor 420. Each first gear pairs with a larger of two intermediate gears that rotate about an intermediate axis. For example, first gear 411 engages with intermediate gear 415 affixed to an intermediate shaft. Intermediate gear 416, coupled to the same intermediate shaft as intermediate gear 415 engages with respective output gear 414 (e.g., coupled to a respective output shaft 418). Further, first gear 421 engages with intermediate gear 425 affixed to an intermediate shaft. Intermediate gear 426, coupled to the same intermediate shaft as intermediate gear 425 engages with respective output gear 424 (e.g., coupled to a respective output shaft 428, aligned with output shaft 418). It will be understood that, as illustrated in FIG. 4, output gears 414 and 424 are aligned, with output gear 424 being positioned behind output gear 414, and only output shaft 418 visible. As described herein, the intermediate shafts may be offset (e.g., not aligned along a line) from the respective motor shaft and drive shaft. It will be understood that any suitable number of gears may be used with any suitable amount of reduction between a motor and corresponding output shaft. In some embodiments, the gearbox may include two or more gears in a gear train. The gear train may include an ordinary gear train or a compound ordinary gear train. For example, a compound gear train may include two gears configured to rotate about a single axis. Gears may include any suitable gear types such as, for example, spur gears, parallel helical gears, any other suitable gear type, or any suitable combination thereof. It will be understood that while the illustrative drive units of the present disclosure are illustrated as including gearboxes and gears, any suitable power transfer mechanisms may be used to transfer power from a motor to an output, in accordance with the present disclosure. For example, chain drives, belt drives may be used. In a further example, a belt tensioner, cog, sprocket, any other suitable hardware, or combination thereof, may be included to transfer power, maintain engagement, or both.

FIG. 5 shows an end view of illustrative "C" type dual drive unit 500, in accordance with some embodiments of the present disclosure. Dual drive unit 500 may be used as a torque vectoring drive unit (e.g., to apply a different torque to each wheel). As illustrated, the motors are aligned along the same rotational axis (e.g., are co-linear) and the corresponding gear boxes are positioned between the two motors (e.g., motor+gearbox 510, and motor+gearbox 520). The output shaft for each motor is oriented in the opposite direction as the corresponding motor shaft. For example, the motor of motor+gearbox 520 is configured to drive the right wheel (e.g., via output shaft 524) while the motor of motor+gearbox 510 is configured to drive the left wheel (e.g., via output shaft 514). This type of drive unit is referred to herein as a "C" type drive unit. The width 550 of dual drive unit 500 includes the full width of motor+gearbox 510 and motor+gearbox 520.

FIG. 6 shows an end view of illustrative "Z" type dual drive unit 600 having a "Z" configuration, in accordance with some embodiments of the present disclosure. Dual drive unit 600 includes two drive units of similar size to that illustrated in FIG. 5. However, the "Z" configuration of dual drive unit 600 has an associated width 650 less than that of width 550 of FIG. 5. For example, the motor of motor+gearbox 620 is configured to drive the left wheel (e.g., via output shaft 624) while the motor of motor+gearbox 610 is configured to drive the right wheel (e.g., via output shaft 614). By aligning the motors along different parallel axes (e.g., not co-linear), the width 650 of the dual drive unit is substantially reduced as compared to dual drive unit 500 of FIG. 5. In some embodiments, for example, the reduced width 650 may be less than the width 550 by the combined widths of the gearboxes. For example, centerline 660 is shown aligned with the middle of dual drive unit 600, and the gearbox for each motor is on the opposite side of centerline than the corresponding motor. In this arrangement, the gearbox for one motor overlaps the other motor when viewed in a direction perpendicular to the axes of the motors. In some embodiments, the first and second motors can partially overlap across centerline 660 as well (e.g., by using a compound gear train). In some embodiments, a reduced width (e.g., width 650 as compared to width 550) and "v-shaped" configuration may allow for a more powerful motor (e.g., a larger motor), or more robust gearbox (e.g., a larger gearbox) to be included.

Figure 7:
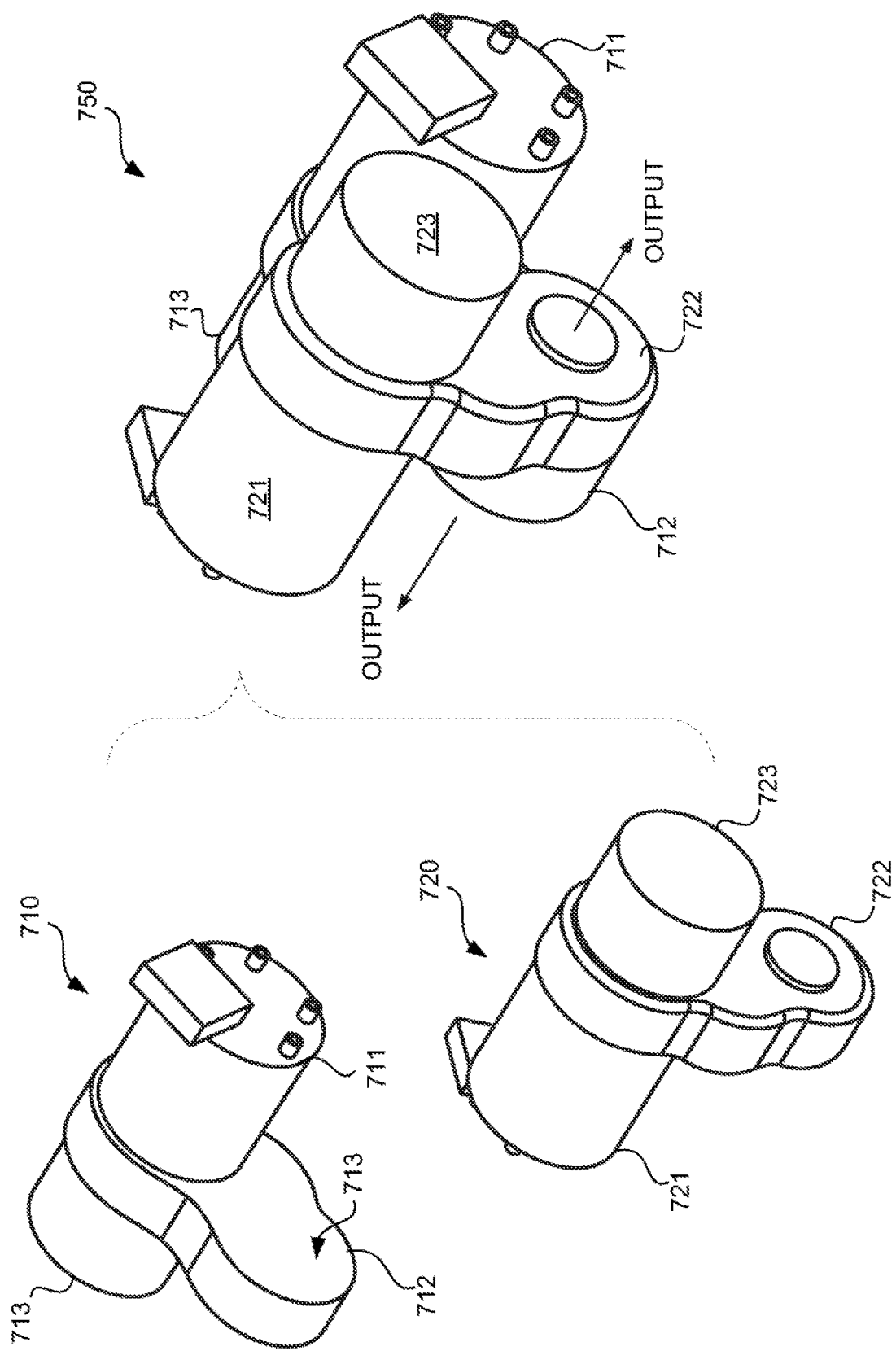
FIG. 7 shows illustrative panels of how two halves of a dual drive unit may be coupled together, in accordance with the present disclosure.

FIG. 7 shows illustrative panels of how two halves of a dual drive unit may be coupled together, in accordance with the present disclosure. Drive unit 710 and drive unit 720 may be coupled together to form dual drive unit 750. For example, region 713 of gearbox 712 may be coupled to a corresponding region (not shown) of gearbox 722 to form dual drive unit 750. To illustrate, drive units 710 and 720 are connected to each other such that the output shafts are aligned along a common axis (e.g., a drive axis) as shown by dual drive unit 750. As illustrated in FIG. 7, drive unit 710 includes power electronics 713 (e.g., an inverter) and drive 720 includes power electronics 723 (e.g., an inverter). For example, power electronics 713 and 723 may be configured to control the operation of respective motors 711 and 721. Power electronics 713 and 723 are aligned with respective motors 711 and 721, and are positioned on the opposite side of respective gearboxes 712 and 722 from respective motors 711 and 721. It will be understood that a "drive axis" refers to the axis of rotation of output gears, output shafts, or both, and may also nominally refer to the corresponding axis of rotation of half shafts and wheels as well (even though suspension travel may render the wheel axis and half shaft axis different from the output gear).

Figure 8:
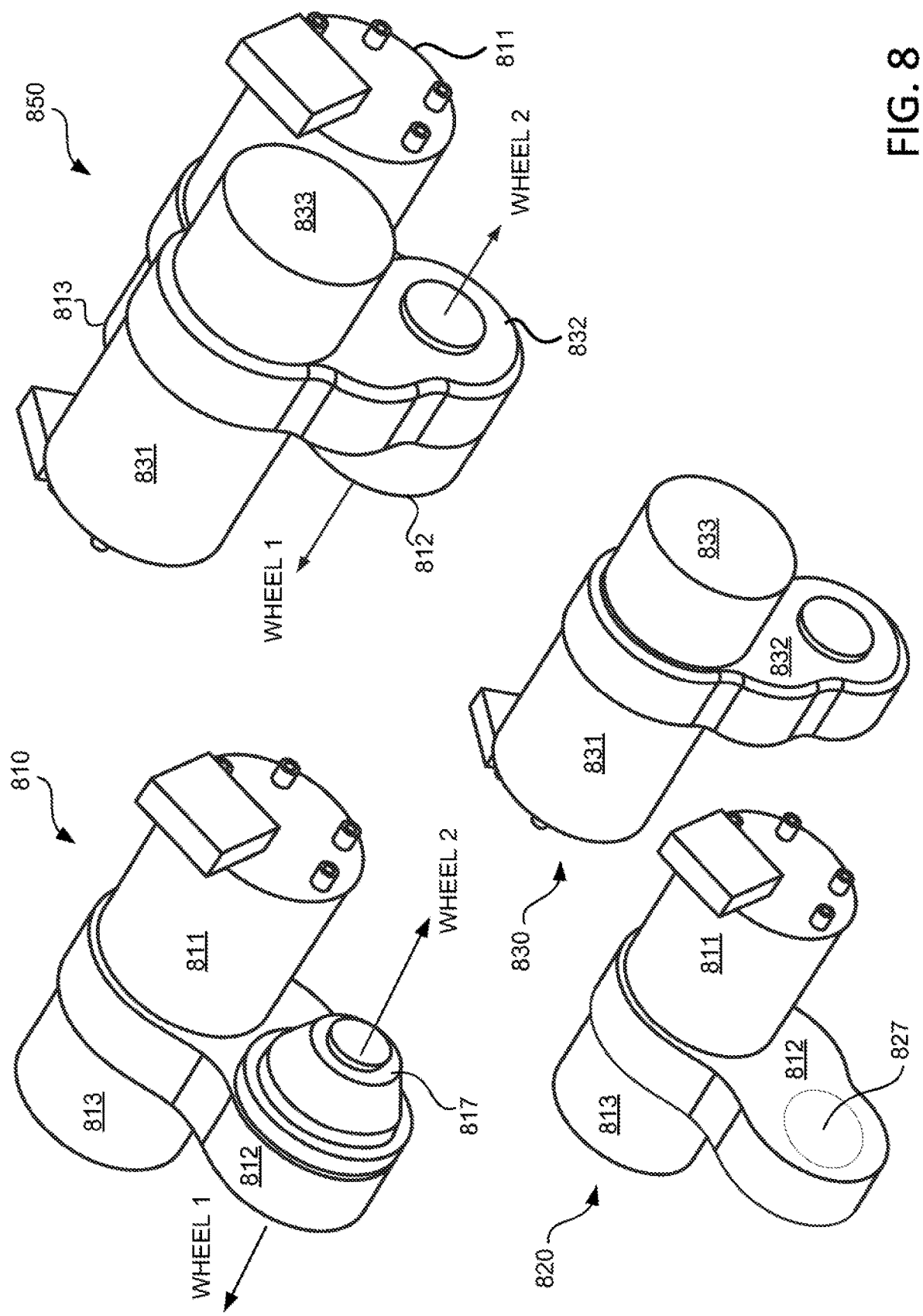
FIG. 8 shows illustrative panels of how two halves of a dual drive unit may be coupled together to replace a differential, in accordance with the present disclosure.

FIG. 8 shows illustrative panels of how two halves of a dual drive unit may be coupled together to replace a differential, in accordance with the present disclosure. Drive unit 810 includes motor 811, power electronics 813, a power transfer mechanism 812 (e.g., a gearbox housing), and differential 817. The first motor may be, for example, an electric motor (e.g., an AC induction motor), of any suitable phase count (e.g., a 3-phase motor), configured to drive two wheels (e.g., "Wheel 1" and "Wheel 2") on a drive axis. Differential 817 is configured to provide power to two output shafts (e.g., two rear wheels, or two front wheels). Power electronics 813 may include an inverter configured to convert DC power to AC power (e.g., convert voltage and current of a DC bus to 3-phase AC voltage and current for a 3-phase motor 811). In some embodiments, motor 811 may include a DC motor, and accordingly, power electronics 813 need not be included, or need not include an inverter (e.g., other components such as a DC-DC converter may optionally be included). Differential 817 may include any suitable differential type such as, for example, an open differential, a limited slip differential, a locking differential, a spool (mechanically locked), an electronically controlled differential, or any other suitable differential. Differential 817 may be configured to receive a single input from power transfer mechanism 812 (e.g., from an output gear of a gearbox housing), and drive two shafts coupled to two respective wheels on a drive axis. Accordingly, drive unit 810 is an example of a drive unit having a single motor configured for driving two wheels on a drive axis, via power transfer mechanism 812 (e.g., a gearbox housing) and differential 817.

In some embodiments, drive unit 810 may be converted to drive unit 820, wherein, for example, differential 817 is removed. In some embodiments, after removal of differential 817, drive unit 820 may be coupled to drive unit 830 to form dual drive unit 850. The conversion from drive unit 810 to dual drive unit 850 may be illustratively performed by removing differential 817 from power transfer mechanism 812, installing a cover plate onto power transfer mechanism 812 where differential 817 used to be, and then coupling drive unit 820 and drive unit 830 together (e.g., wherein drive unit 830 may, but need not, include a cover plate). In some embodiments, housings of power transfer mechanisms 812 and 832 may be bolted together, or otherwise affixed to one another, to provide structural rigidity. Motor 831 and power transfer mechanism 832 may be substantially similar to respective motor 811 and power transfer mechanism 812, but positioned 180° around an axis normal to the drive axis.

Under most circumstances, wheel 1 and wheel 2 are desired to turn in the same direction, even if not at the same speed. Accordingly, motor 811 and motor 831 may be configured to rotate in the same direction as the output gears (e.g., and wheels). Further, for dual drive unit 850, power transfer mechanism 832 would turn in the opposite orientation as power transfer mechanism 812. For example, if power transfer mechanisms 812 and 832 include gearboxes, the second gear-train (i.e., of power transfer mechanism 832) would be spinning in the opposite direction than the first gear-train (i.e., of power transfer mechanism 812), relative to the respective gearbox housings. In some circumstances, this may be undesirable in view of gear lash and chatter, and accordingly, it may be desired to mount each of the gears of the second gearbox rotated 180° about a respective axis normal to the respective axis of rotation (e.g., remove a gear, flip it around 180°, and reinstall on the same shaft). Accordingly, in some embodiments, for a given set of hardware, a power transfer mechanism may be configurable for a particular drive direction, which reduces, or eliminates, the need for additional components. In some embodiments, reconfiguration may require, for example, flipping gears, re-aligning gears, re-lashing gears, performing measurements, or other suitable actions.

In some embodiments, it may be desirable to create dual drive unit 850 by using two similar, or identical, single drive units (e.g., drive units 820 and 830). In addition to the gear rotation direction (e.g., discussed above), there are several other considerations which may impact the extent to which the drive units are identical. The location of an oil pump (e.g., gear driven from a gear of the corresponding power transfer mechanism), oil pickup, oil sump, or otherwise location of all or part of the oiling system of a power transfer mechanism may impact the conversion from single to dual drive unit configurations, and orientations of the power transfer mechanisms therein. For example, referencing FIG. 8, power transfer mechanisms 812 and 832 may have different drop angles for oil in the bottom of respective gearbox housings. Accordingly, an oil pickup, for example, may need to be moved, or otherwise adjusted, to accommodate the relative difference in orientation of the power transfer mechanisms. In some embodiments, multiple oil pickups are integrated in the power transfer mechanism and the appropriate one is used based on the drop angle. For example, the unused oil pickups may be sealed or capped off. It would be desirable to be able to accommodate drop angles ranging from 0° to 90°. A further consideration may be that a gear driven oil pump for the housings may spin in opposite directions. For example, in addition to "flipping the gears" of the power transfer mechanism, an oil pump drive gear may also need to be flipped. Another consideration is that the first and second motors may rotate in opposite directions, relative to the local motor housing, when the output shafts are spinning together. For example, referencing FIG. 8, when viewed from the respective power electronics' ends (e.g., ends of power electronics 813 and 833), if motor 831 is turning clockwise (CW), and Wheel 1 and Wheel 2 are turning in the same direction, motor 811 is turning counter clockwise (CCW). In some embodiments, motor 831, motor 811, or both, may need to be adjusted for dual drive unit 850. For example, for some 3-phase motors and controllers, two phases may need to be swapped to impart the desired direction to the motor.

Power transfer mechanism 812, which may include a gearbox housing, may be configured to couple a motor shaft of motor 811 to an output gear coupled to differential 817. In some embodiments, power transfer mechanism 812 may include a motor mount configured for mounting of motor 811, as well as a first space to accommodate an input gear (e.g., a first gear) coupled to motor 811. In some embodiments, power transfer mechanism 812 may also include a second space to accommodate an output gear (e.g., coupled to differential 817 as illustrated by drive unit 810). In some embodiments, power transfer mechanism 812 may include at least one intermediate gearset which interfaces with the input gear and the output gear, providing a gear reduction from the motor to the output (e.g., the motor shaft rotates faster, with less torque, than the output shaft, typically). In some embodiments, power transfer mechanism 812 may include a first opening in a first side of the housing adjacent to the second space to accommodate differential 817, a cover plate, or both. For example, the first opening may include a mount for mounting differential 817 and cover plate 827 (e.g., depending on the configuration). A second opening on the opposite side may accommodate an output shaft, which may couple the output gear to Wheel 1 (e.g., via coupling and half shaft). When differential 817 is mounted to power transfer mechanism 812, drive unit 810 may drive both Wheel 1 and Wheel 2. When cover plate 827 is mounted to the mount, thus forming drive unit 820, drive unit 820 may drive Wheel 1. Power transfer mechanism 832 may have similar attributes, and accordingly is configured to drive Wheel 2 when coupled to power transfer mechanism 812, as shown by dual drive unit 850.

In some embodiments, conversion from drive unit 810 to dual drive unit 850, or assembling dual drive unit 850 without conversion, may include, for example, mechanical installation steps including mechanical components. For example, an output gear, an output shaft, and/or one or more bearings may be replaced or installed, one or more gaskets, seals (e.g., shaft seals) may be installed, one or more cover plates may be installed, one or more spacers may be installed, any other suitable components may be installed, removed, or replaced, or any combination thereof. For example, in some embodiments, one or more components may be swapped, replaced, or otherwise changed to accommodate the conversion.

In some embodiments, a configuration similar to drive unit 810 may be desired, but with a different differential (e.g., different from differential 817). In some embodiments, the present disclosure is directed to a modular drive system that allows, for example, different differentials, or other components, to be installed. For example, in some circumstances an open differential may be included, while in other circumstances, a limited slip differential or locking differential may be included. Accordingly, a single drive unit may be converted from one differential type to another, or may be built up using any suitable desired differential (e.g., not converted but built as desired from constituent components).

The ability to use a single drive unit, and components thereof, to construct a dual drive unit based on powertrain requirements may reduce, or eliminate, the need to scale a powertrain design (e.g., re-engineer, re-tool, re-manufacture components). In some embodiments, for example, a single drive unit may be sized to accommodate the powertrain requirements of a small, or low performance, vehicle. Accordingly, another single drive unit may be installed to create a dual drive unit to accommodate increased powertrain demands without having to scale powertrain components (e.g., rather than making components bigger, add more of the same components).

In some circumstances, modularity may reduce the number of unique parts among various drive configurations, and also reduce engineering-design-development (ED&D) efforts, lead time, and cost. For example, while a single drive unit having higher power/torque output can be designed and manufactured using new unique components, a dual drive unit may be used instead to achieve the same power/torque output capability, but with an increase in the number of total parts in the build as compared to the single drive unit (e.g., roughly double the number of parts). In addition, such a higher power single drive unit may not be capable of torque vectoring. Accordingly, the modular components of the present disclosure are able to satisfy both low-power and high-power builds (e.g., the same modular parts can be used in both).

Considering dual drive unit systems, in some embodiments, each motor drives one wheel. For example, a motor may correspond to, and have full independent torque control over, a wheel.

Modularity may also allow various components to be installed. In some embodiments, the present disclosure is directed to a configuration having a clutch mechanism installed between two output shafts, allowing the drive units to be controllably coupled together. For example, in the event that one wheel on a drive axis has limited traction (e.g., due to snow, ice, or sand), a clutch may allow torque from both motors to be applied to the wheel having traction (e.g., rather than just reducing torque applied to the slipping wheel).

Figure 9:
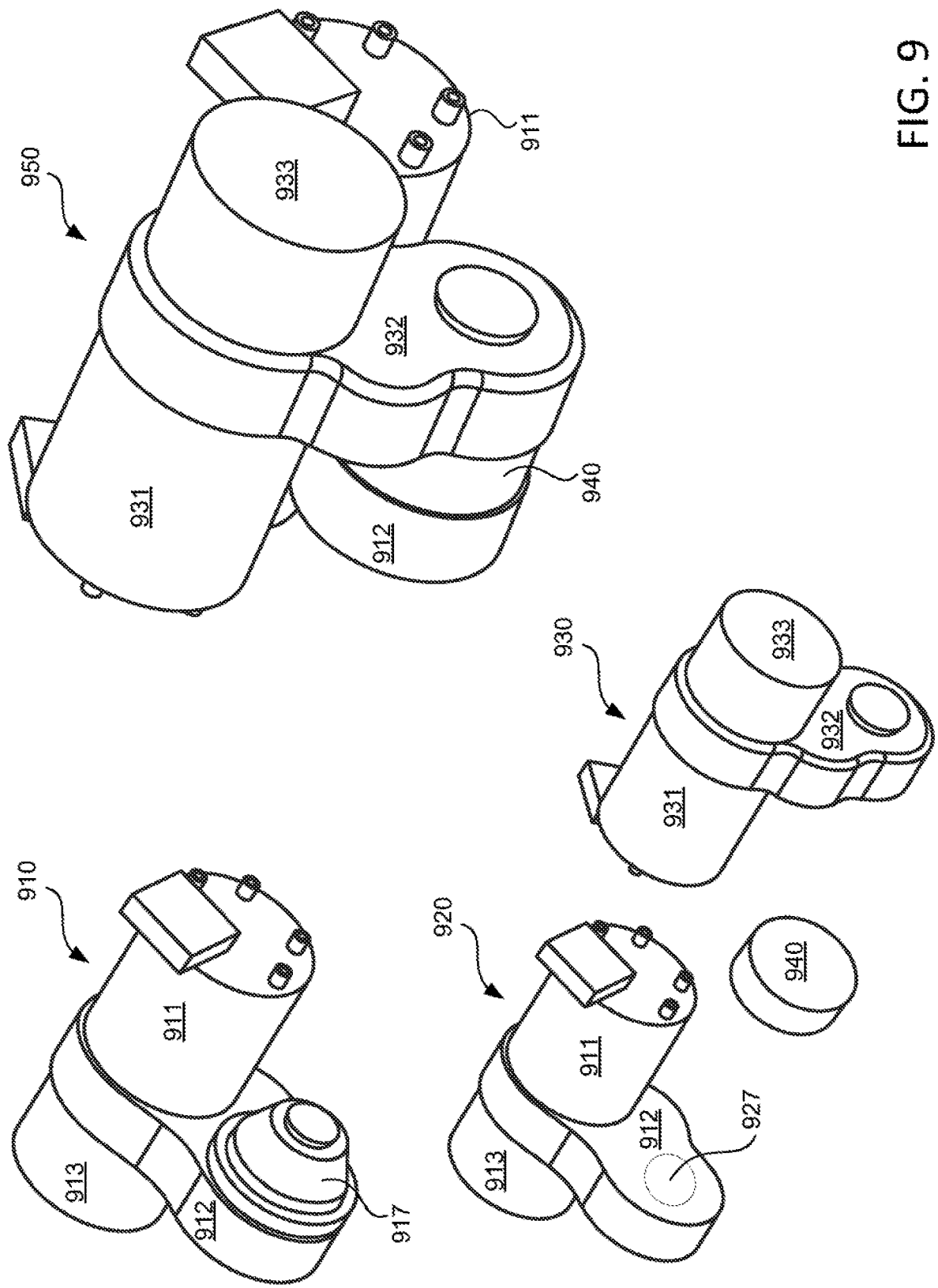
FIG. 9 shows illustrative panels of how a clutch assembly may be installed to couple two drive units, in accordance with some embodiments of the present disclosure.

FIG. 9 shows illustrative panels of how clutch assembly 940 may be installed to couple drive units 920 and 930 together (e.g., in some embodiments, the same or similar drive units as FIG. 8), in accordance with some embodiments of the present disclosure. Clutch mechanism 940 may be coupled to each output shaft, output gear, or both, in dual drive unit 950. When engaged, clutch mechanism 940 locks the two output shafts together (e.g., allowing torque transfer between wheels). When disengaged, the output shafts can rotate independently of each other. For example, clutch mechanism 940 can be engaged when wheel slip is detected in one of the wheels or when a vehicle is set to certain driving modes. When clutch mechanism 940 is engaged and one wheel slips, the torque of both motors may be applied to the wheel that is not slipping which may be desired for, for example, maximum acceleration in split-friction ("split p") track conditions, or while driving in extreme off-road conditions (e.g., rock-crawling). For example, when torque vectoring is desired, clutch mechanism 940 may be disengaged. In some circumstances, the use of a clutch may also allow both wheels on a drive axis to be driven by one motor, if the other motor experiences a failure or otherwise is inactive. Clutch assembly 940 may include any suitable type of clutch, which may allow slip or not, and may operate dry or wet. For example, clutch assembly 940 may include a plate-type clutch (e.g., with one or more pressure plates and friction disks), a cone-type clutch, a centrifugal clutch, a torque limiting clutch (e.g., which disengages partially at high torque values), any other suitable type of clutch, or any combination thereof. Clutch mechanism 940 may be controlled in any suitable way such as, for example, a cable actuator, a hydraulic actuator, a pneumatic actuator, an electric actuator, or a combination thereof.

In some embodiments, drive unit 910 is similar to drive unit 810 of FIG. 8, and includes motor 911 configured to drive two wheels of a drive axis via power transfer mechanism 912 and differential 917. Drive unit 910 may be converted to drive unit 920 (e.g., no clutch), and then included in a dual drive unit (e.g., dual drive unit 950 of FIG. 9). For example, the conversion from single drive unit to dual drive unit may include removing differential 917 from drive unit 910 and installing clutch mechanism 940 between drive unit 920 and drive unit 930 to form drive unit 950. Accordingly, clutch assembly 940 is configured to engage with the output (e.g., either gear, shaft, flywheel, or other coupled output) of each of power transfer mechanisms 912 and 932. In some embodiments, clutch assembly 940 is configured to engage the two outputs to, for example, transfer torque between drive units 920 and 930. Dual drive unit 950 may be used to, for example, drive both wheels with both motors, drive both wheels with one motor (e.g., if one motor is left unpowered), drive one wheel primarily with both motors (e.g., if one wheel is slipping), lock-up the output shafts (e.g., similar to a spool type differential), or otherwise provide additional control of dual drive unit 950.

In some embodiments, installation of clutch assembly 940 may include installing cover plates (e.g., cover plate 927 with suitable pass-throughs and mounting features) on a housing of each of power transfer mechanisms 912 and 932. In some embodiments, clutch assembly 940 includes a clutch housing which is aligned to housings of power transfer mechanisms 912 and 932 (e.g., via pins, lips, steps, or other locating features). In some embodiments, the clutch housing may include one or more bolt patterns (e.g., including through holes, threaded holes, studs, or other fastening features) for rigidly mounting the clutch assembly to power transfer mechanisms 912 and 932.

Dual drive unit 950 of FIG. 9 may be considered a combination of two "Z" type drive units, wherein each motor extends from the corresponding power transfer mechanism on the opposite side from the corresponding driven wheel (e.g., and corresponding half-shaft). A clutch mechanism may also be used to couple "C" type drive units, such as dual drive unit 500 shown illustratively in FIG. 5.

Figure 10:
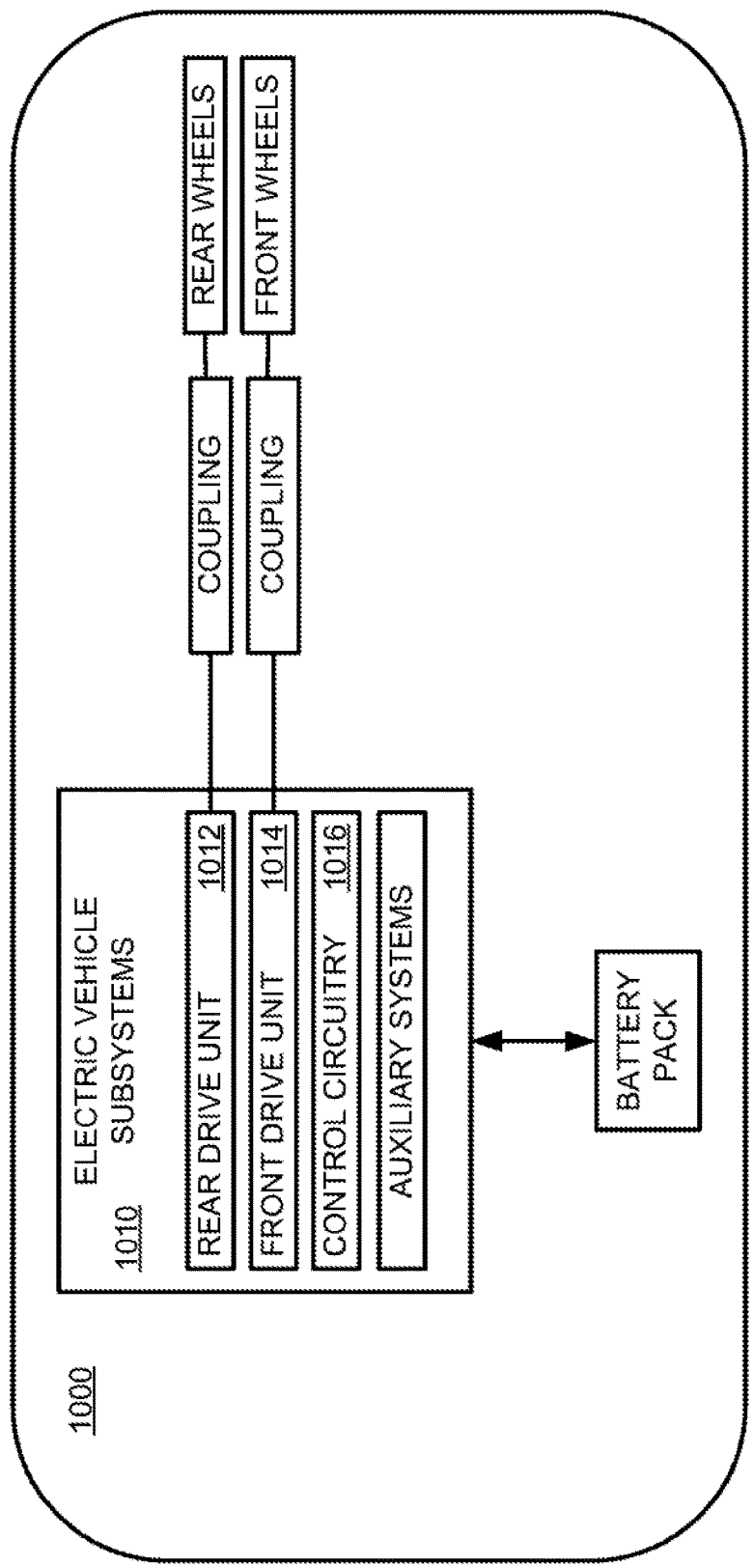
FIG. 10 shows a block diagram of an illustrative electric vehicle having a control system for controlling one or more drive units, in accordance with some embodiments of the present disclosure.

FIG. 10 shows a block diagram of illustrative electric vehicle 1000 having a control system for controlling one or more drive units, in accordance with some embodiments of the present disclosure. Electric vehicle 1000 includes a battery pack, electric vehicle subsystems 1010, suspension, and wheels. Electrical vehicle subsystems 1010 includes, for example, rear drive unit 1012, front drive unit 1014, control circuitry 1016, auxiliary systems, and any other suitable corresponding equipment.

In some embodiments, control circuitry 1016 may include processing equipment, memory, power management components, any other suitable components for controlling one or more drive unit (e.g., front drive unit 1014 and rear drive unit 1012), or any combination thereof. For example, control circuitry 1016 may control current flow (e.g., amount of current and current direction) to phases of an electric motor of one or more drive units. In a further example, control circuitry 1016 may control clutch operation (e.g., using an electromagnetically-actuated clutch) in a dual drive unit. In a further example, control circuitry 1016 may control differential operation (e.g., using an electromagnetically-actuated differential) in a dual drive unit. In some embodiments, control circuitry 1016 may include one or more sensors, one or more sensor interfaces (e.g., for sensors that are included as part of a drive unit), corresponding wiring, corresponding signal conditioning components, any other suitable components for sensing a state of a drive unit, or any combination thereof. For example, control circuitry may include a speed sensor (e.g., a rotary encoder), a current sensor, a voltage sensor, a temperature sensor, any other suitable sensor, or any combination thereof. In some embodiments, control circuitry 1016 may be implemented by central controller, a plurality of distributed control systems, an embedded system, or any combination thereof. For example, control circuitry 1016 may be at least partially implemented by an electronic control unit (ECU). In a further example, the electric vehicle may include a power electronics system that is controlled by the ECU and is configured to manage current to one or more electric motors of one or more drive units. Rear drive unit 1012 may be coupled to wheels of the electric vehicle by a half shaft, a constant-velocity joint, one or more suspension/steering components, any other suitable coupling, or any suitable combination thereof. Front drive unit 1014 may be coupled to wheels of the electric vehicle by a half shaft, a constant-velocity joint, one or more suspension/steering components, any other suitable coupling, or any suitable combination thereof. For example, a wheel may be mounted to a hub that is includes a bearing for a half-shaft, wherein the hub is coupled to suspension/ steering components that are mounted to the vehicle frame (e.g., wherein the drive units are also mounted to the vehicle frame).

In some embodiments, a drive system may include a first drive unit, a second drive unit, and a clutch assembly configured to transfer torque between the first and second drive units (e.g., as shown by dual drive unit 950 of FIG. 9). In some embodiments, a system, in addition to including a drive unit (e.g., single or dual), may include processing equipment configured to activate and deactivate the clutch assembly to transfer torque, manage motor operation, manage regeneration (e.g., using the motor as a generator), perform any other control function, or any combination thereof. Activating and deactivating a clutch assembly may refer to completely, or partially, increasing or decreasing the engagement of the first and second output shafts via the clutch assembly (e.g., using control circuitry). For example, activating a clutch assembly may include completely locking the clutch, allowing some slip of the clutch, or otherwise transferring an amount of torque between the output shafts. In some embodiments, the drive unit may include at least one sensor (e.g., coupled to a sensor interface of control circuitry) configured to sense wheel slippage and the control circuitry may be further configured to receive a signal from the at least one sensor, detect that wheel slippage is occurring, and activate the clutch assembly in response to detecting that wheel slippage is occurring. For example, a sensor may detect shaft speed (e.g., an output shaft speed, as measured by an encoder) or output torque (e.g., an output shaft torque, or a motor torque). In some embodiments, the drive system may include an accelerator pedal configured to indicate a desired speed (e.g., by being depressed by a user), and the processing equipment may receive a signal from the accelerator pedal, determine a speed parameter based on the signal, and activate the clutch assembly if the speed parameter is above a threshold. For example, if a user "floors" the accelerator pedal (e.g., more than 50% demand), the control circuitry may activate the clutch assembly to lock the output shafts together. In some embodiments, the control circuitry may activate and deactivate the clutch assembly based on road conditions (e.g., icy roads, puddles, high winds), a drive mode (e.g., an off-road mode, a sport mode, or a traction mode), any other suitable criterion, or any combination thereof.

In some embodiments, one or more brackets, affixed at one or more locations, may be used to rigidly connect the two motors of the dual drive unit, two power transfer mechanism housings of the dual drive unit, or both, to ensure that all the components of the dual drive unit act as a single rigid body under normal operating conditions. In some embodiments, a boss, a tab, or other suitable feature may be included on a housing to aid in mounting.

It will be understood that the "V" shape is merely illustrative and any other suitable orientations of the motors can be used. For example, in some embodiments, the two motors may be positioned on opposite sides of the output shafts such that motor axes and the common axis of the output shafts are all aligned along a common line.

In some embodiments, one or more drive units may be included in a vehicle. For example, Table 1 includes some illustrative configurations in accordance with the present disclosure.

For any of the four illustrative examples included in Table 1 having a single drive unit ("single"), a second drive unit may be installed in accordance with the present disclosure to provide more power, provide improved torque vectoring, or otherwise provide more control. Further, a clutch assembly may be included in any dual drive unit ("dual"), allowing transfer of torque between the output shafts on a drive axis.

TABLE 1

| Illustrative drive unit arrangements in vehicles. | | | | | | | |
|---|---|---|---|---|---|---|---|
| High Performance, twin torque vectoring at both the front and rear drive axes | | High Performance, with rear twin torque vectoring and differential in front | | All wheel drive and small vehicle, with differential in front and rear | | Small vehicle, with differential in front, and no rear drive | |
| Front | Rear | Front | Rear | Front | Rear | Front | Rear |
| Dual | Dual | Single w/ Diff | Dual | Single w/ Diff | Single w/ Diff | Single w/ Diff | None |

It will be understood that the modularity of the present disclosure is not limited to converting one drive unit configuration to another. The modularity of the drive unit also enables one or more modular components to be assembled in one of multiple possible drive unit configurations. This has various advantages. For example, instead of designing, testing, and stocking different types of components for each drive unit configuration, a single modular component can be used for the different drive unit configurations. A modular power transfer mechanism can, for example, be used to drive a single wheel or two wheels via a differential. The modular power transfer mechanism can also be used alone or together with a second modular power transfer mechanism. When used with a second modular power transfer mechanism, the mechanisms can be used with or without a clutch assembly. Accordingly, the modularity provides versatility and reduces costs.

Figure 11:
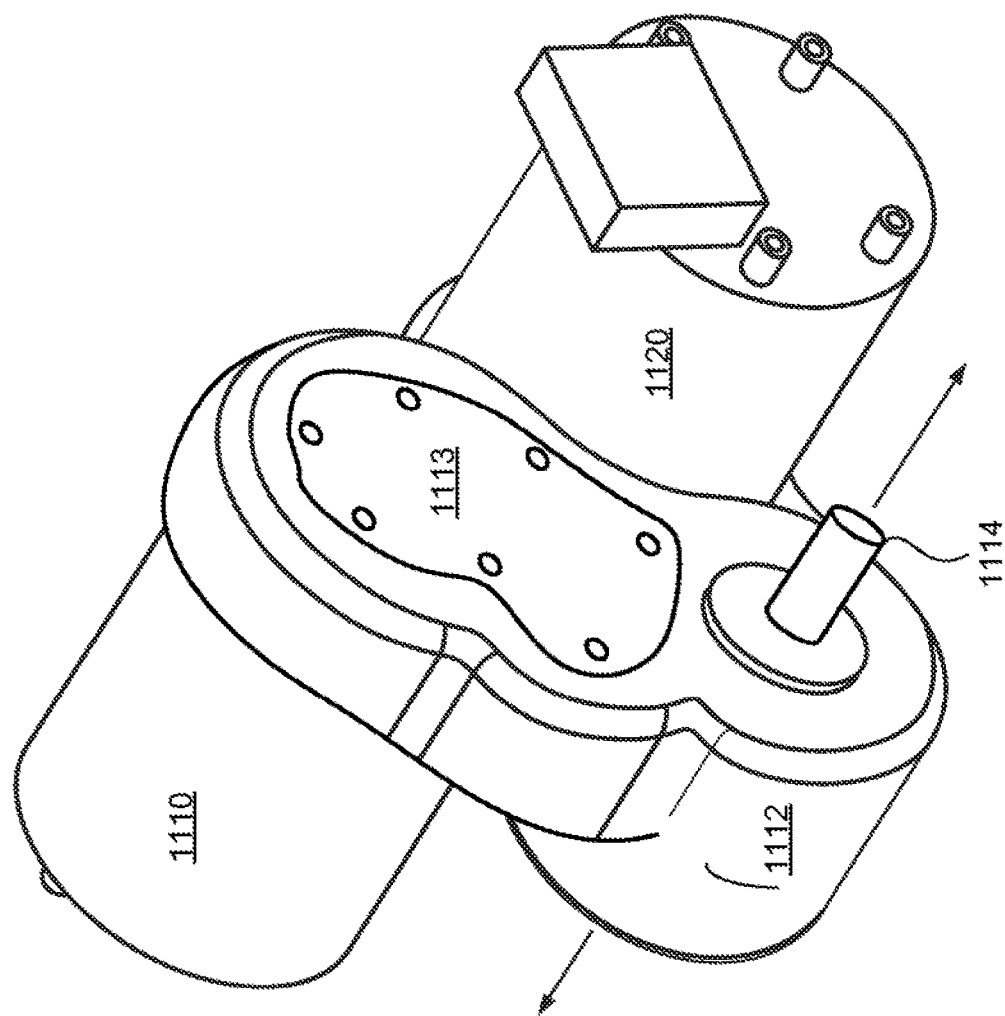
FIG. 11 shows a perspective view of an illustrative dual drive unit having a single gear housing, in accordance with some embodiments of the present disclosure.

FIG. 11 shows a perspective view of illustrative dual drive unit 1100 having a single gear housing (e.g., gearbox 1112), in accordance with some embodiments of the present disclosure. Dual drive unit 1100 may similar to, for example, dual drive unit 100 of FIG. 1, except that a single housing is included rather than two housings coupled together, although the drivetrain may still be referred to as having two halves. Dual drive unit 1100 includes motor 1110, motor 1120, and gearbox 1112 (a housing, bearings, shafts, gearset, pulley set, and/or cog set) that couples the motors to respective gear trains (e.g., or pulleys, chains or other suitable drive mechanisms) and respective output shafts (e.g., such as output shaft 1114). In some embodiments, as illustrated, gearbox 1112 may include one or more panels 1113 configured to provide access to the internal region of gearbox 1112 (e.g., the gears, shafts, bearings, oil pump, or other components). For example, panel 1113 may include a flange, a bolt pattern, locating features (e.g., a pin or locating hole), a seal (e.g., a gasket or O-ring), a sight glass, any other suitable components, or any suitable combination thereof. In some embodiments, for example, gearbox 1112 may include two panels, one on either side of the housing. In some embodiments, for example, the housing of gearbox 1112 may be cast as a single piece. For example, gearbox 1112 may include two motor openings and two output openings. In some embodiments, a gearbox housing need not include a panel (e.g., access may be gained via motor openings or output openings). The use of a single housing, rather than two coupled housings, may reduce or avoid the need for alignment. Further, the use of a single housing may avoid the need for interfacing structures (e.g., flanges, reinforcements, fasteners) that may add size or mass to the housing.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A drive system, comprising:
a first power transfer mechanism configured to couple a first motor shaft, a first intermediate shaft, and a first output shaft configured to rotate about a drive axis, wherein the first intermediate shaft is offset from a first line extending from the first motor shaft to the first output shaft; and
a second power transfer mechanism configured to couple a second motor shaft, a second intermediate shaft, and a second output shaft configured to rotate about the drive axis, wherein the second intermediate shaft is offset from a second line extending from the second motor shaft to the second output shaft, and wherein:
the first power transfer mechanism comprises a first housing extending between the first motor shaft and the first output shaft;
the first housing comprises an indentation configured to accommodate the second motor and the first intermediate shaft;
the second power transfer mechanism comprises a second housing extending between the second motor shaft and the second output shaft;
the second housing comprises an indentation configured to accommodate the first motor and the second intermediate shaft; and
the indentations of the first housing and the second housing are configured to reduce an angle between the first and second lines.

2. The drive system of claim 1, wherein the first power transfer mechanism and the second power transfer mechanism each comprise a gear train.

3. The drive system of claim 2, wherein the gear train of the first power transfer mechanism comprises:
a first gear coupled to the first motor shaft;
at least one second gear coupled to the first intermediate shaft; and
a third gear coupled to the first output shaft, wherein the first gear mechanically interfaces with the at least one second gear and wherein the at least one second gear mechanically interfaces with the third gear.

4. The drive system of claim 3, wherein:
the at least one second gear comprises two gears coupled to the first intermediate shaft;
the two gears comprise a first larger gear and a second smaller gear;
the first larger gear mechanically interfaces with the first gear;
the second smaller gear mechanically interfaces with the third gear; and
the first power transfer mechanism and the second power transfer mechanism each provide a gear reduction.

5. The drive system of claim 3, wherein the first intermediate shaft is offset from a line considered to extend from the first motor shaft to the first output shaft.

6. The drive system of claim 1, wherein:
the first power transfer mechanism comprises a first end proximate to the first motor axis and a second end proximate to the first output shaft;
the second end of the first power transfer mechanism is located a first distance away from the first motor axis, which is greater than a distance from the first motor axis to an outer side surface of the first motor;
the second power transfer mechanism comprises a first end proximate to the second motor axis and a second end proximate to the second output shaft;
the second end of the second power transfer mechanism is located a second distance away from the second motor axis, which is greater than a distance from the second motor axis to an outer side surface of the second motor; and
the second end of the first power transfer mechanism is adjacent to the second end of the second power transfer mechanism.

7. The drive system of claim 6, wherein the second end of the first power transfer mechanism is mechanically connected to the second end of the second power transfer mechanism.

8. The drive system of claim 1, wherein the first power transfer mechanism and the second power transfer mechanism each comprise a chain drive or a belt drive.

9. The drive system of claim 1, wherein the first motor shaft and the second motor shaft at least partially overlap when viewed in a direction perpendicular to the first motor axis.

10. The drive system of claim 1, wherein:
the first motor comprises a first motor housing;
the second motor comprises a second motor housing; and
the first motor housing and the second motor housing partially overlap each other when viewed in a direction perpendicular to the first motor axis.

11. The drive system of claim 1, wherein the first motor shaft extends from the first motor in a first direction and wherein the first output shaft extends from the first power transfer mechanism in the first direction.

12. The drive system of claim 11, wherein the second motor shaft extends from the second motor in a second direction, wherein the second output shaft extends from the second power transfer mechanism in the second direction, and wherein the first direction and second direction are opposite directions.

13. The drive system of claim 1, wherein the angle between the first line and the second line is less than 90 degrees.

14. The drive system of claim 1, further comprising:
a first inverter configured to control the operation one of the first motor and the second motor, wherein the first inverter is aligned with first motor axis and mechanically coupled to the first power transfer mechanism; and
a second inverter configured to control the operation the other of the first motor and the second motor, wherein the second inverter is aligned with second motor axis and mechanically coupled to the second power transfer mechanism.

15. The drive system of claim 1, further comprising a clutch assembly coupled to the first output shaft and the second output shaft, wherein the clutch assembly, when engaged, is configured to lock the first output shaft and the second output shaft together.

16. The drive system of claim 1, further comprising:
a first half shaft, wherein a first end of the first half shaft is coupled to the first output shaft;
a first wheel, wherein a second end of the first half shaft is coupled to the first wheel;
a second half shaft, wherein a first end of the second half shaft is coupled to the second output shaft; and
a second wheel, wherein a second end of the second half shaft is coupled to the second wheel.

17. A drive system, comprising:
a first power transfer mechanism comprising a first housing and configured to couple rotation of a first motor shaft of a first motor to rotation of a first output shaft about a drive axis using an offset first intermediate gear, wherein the first motor shaft rotates about a first motor axis parallel to the drive axis; and
a second power transfer mechanism comprising a second housing and configured to couple rotation of a second motor shaft of a second motor to rotation of a second output shaft about the drive axis using an offset second intermediate gear, wherein the second motor shaft rotates about a second motor axis parallel to the drive axis and spaced apart from the first motor axis, and wherein:
the first housing comprises a first indentation and a first protrusion configured to accommodate the offset first intermediate gear and the second motor; and
the second housing comprises a second indentation and a second protrusion configured to accommodate the offset second intermediate gear and the first motor.

18. A drive system comprising:
a first housing configured to couple rotation of a first motor shaft of a first motor to rotation of a first output shaft about a drive axis using an offset first intermediate gear; and
a second housing configured to couple rotation of a second motor shaft of a second motor to rotation of a second output shaft about the drive axis using an offset second intermediate gear, wherein:
the first housing comprises a first indentation and a first protrusion to accommodate the offset first intermediate gear and the second motor; and
the second housing comprises a second indentation and a second protrusion to accommodate the offset second intermediate and the first motor.

* * * * *